United States Patent
Chang et al.

(10) Patent No.: US 11,868,587 B2
(45) Date of Patent: Jan. 9, 2024

(54) SYSTEM AND METHOD FOR TRACKING CHANGES BETWEEN A CURRENT STATE AND A LAST STATE SEEN BY A USER

(71) Applicant: Digits Financial, Inc., San Francisco, CA (US)

(72) Inventors: Wayne Chang, North Andover, MA (US); Jeffrey Hall Seibert, Jr., San Mateo, CA (US); Manuel Deschamps Rascon, Green Cove Springs, FL (US); Mark Eli Moreau Roseboom, Oakland, CA (US)

(73) Assignee: Digits Financial, Inc., San Francisco, CA (US)

( * ) Notice: Subject to any disclaimer, the term of this patent is extended or adjusted under 35 U.S.C. 154(b) by 0 days.

(21) Appl. No.: 17/960,424

(22) Filed: Oct. 5, 2022

(65) Prior Publication Data

US 2023/0023849 A1    Jan. 26, 2023

Related U.S. Application Data

(63) Continuation of application No. 17/325,521, filed on May 20, 2021, now Pat. No. 11,592,957, which is a continuation of application No. 16/716,099, filed on Dec. 16, 2019, now Pat. No. 11,048,378.

(51) Int. Cl.
| | |
|---|---|
| G06F 17/00 | (2019.01) |
| G06F 3/04817 | (2022.01) |
| G06T 11/00 | (2006.01) |
| G06F 3/0487 | (2013.01) |
| G06F 3/0489 | (2022.01) |
| G06Q 90/00 | (2006.01) |

(52) U.S. Cl.
CPC ........ *G06F 3/04817* (2013.01); *G06T 11/001* (2013.01); *G06F 3/0487* (2013.01); *G06F 3/04897* (2013.01); *G06Q 90/00* (2013.01)

(58) Field of Classification Search
CPC .... G06F 3/04817; G06F 3/04812; G06F 3/01; G06T 11/001
USPC ....................................................... 715/864
See application file for complete search history.

(56) References Cited

U.S. PATENT DOCUMENTS

| | | | |
|---|---|---|---|
| 5,303,146 A | * | 4/1994 | Ammirato ............... G06F 40/18 715/204 |
| 5,339,392 A | | 8/1994 | Risberg |
| 6,112,015 A | | 8/2000 | Planas |
| 6,799,209 B1 | | 9/2004 | Hayton |

(Continued)

OTHER PUBLICATIONS

Anonymous "Detect If Browser Tab Has Focus," Sep. 12, 2011, https://stackoverflow.com/questions/7389328/detect-if-browser-tab-has-focus [retreived on Aug. 11, 2021], 8 pages.

(Continued)

*Primary Examiner* — Stephen S Hong
*Assistant Examiner* — Matthew J Ludwig
(74) *Attorney, Agent, or Firm* — Cesari and McKenna, LLP (57) ABSTRACT

A system and method for tracking differences between a last state seen by a user and a current state is provided. A user views a graphical user interface (GUI) wind that displays one or more states. Should the user's focus shift from the GUI and return after one or more states displayed therein have been modified, the system highlights the change between the current state and the user's last seen state.

20 Claims, 11 Drawing Sheets

(56) References Cited

U.S. PATENT DOCUMENTS

| | | | | |
|---|---|---|---|---|
| 6,834,306 | B1* | 12/2004 | Tsimelzon | G06F 16/958 709/224 |
| 8,232,962 | B2* | 7/2012 | Buck | G06Q 40/04 705/7.29 |
| 8,656,270 | B2* | 2/2014 | Rui | G06F 40/18 707/723 |
| 9,069,747 | B2* | 6/2015 | Ueberschaer | G06F 40/18 |
| 9,350,950 | B2 | 5/2016 | Carden | |
| 9,489,190 | B1 | 11/2016 | Wang | |
| 9,836,194 | B2 | 12/2017 | Hirano | |
| 10,003,635 | B1 | 6/2018 | Seibert, Jr. | |
| 10,331,190 | B2* | 6/2019 | Veiga | G06F 3/017 |
| 10,460,387 | B2* | 10/2019 | Singer | G06F 3/013 |
| 10,528,209 | B2 | 1/2020 | Alcorn | |
| 10,691,445 | B2* | 6/2020 | Garg | G06F 11/3664 |
| 10,732,789 | B1 | 8/2020 | Marcinelli | |
| 10,884,571 | B2* | 1/2021 | Otero | G06F 40/18 |
| 11,013,998 | B2* | 5/2021 | Nishikawa | A63F 13/355 |
| 2002/0166118 | A1 | 11/2002 | Kovan | |
| 2003/0210265 | A1 | 11/2003 | Haimberg | |
| 2004/0103373 | A1 | 5/2004 | Wei | |
| 2006/0037038 | A1 | 2/2006 | Buck | |
| 2008/0091774 | A1 | 4/2008 | Taylor | |
| 2008/0155427 | A1 | 6/2008 | Leblay | |
| 2008/0215347 | A1 | 9/2008 | Suzuki | |
| 2009/0094551 | A1 | 4/2009 | Alkov | |
| 2009/0198809 | A1 | 8/2009 | Goto | |
| 2011/0161223 | A1* | 6/2011 | Buck | G06F 3/0482 705/37 |
| 2012/0109813 | A1 | 5/2012 | Buck | |
| 2012/0303507 | A1 | 11/2012 | Arnold et al. | |
| 2013/0031462 | A1 | 1/2013 | Calvo | |
| 2013/0176328 | A1 | 7/2013 | Pillai | |
| 2014/0033101 | A1 | 1/2014 | Rein | |
| 2014/0049462 | A1 | 2/2014 | Weinberger | |
| 2014/0229360 | A1 | 8/2014 | Schluetter et al. | |
| 2015/0160976 | A1 | 6/2015 | Kim | |
| 2017/0132016 | A1 | 5/2017 | Zilberman | |
| 2017/0153889 | A1 | 6/2017 | Joglekar | |
| 2018/0307312 | A1 | 10/2018 | Buck | |
| 2019/0378434 | A1 | 12/2019 | Bland | |

OTHER PUBLICATIONS

Anonymous "Run Javascript Ajax calls only when the page is being viewed", May 23, 2017, https://stackoverflow.com/questions/9174035/run-javascript-ajax-calls-only-when-the-page-is-being-viewed?noredirect+1&1q+1 [retrieved on Aug. 11, 2021], 4 pages.

Anonymous "Page Visibility API—Web APIs MDN", Jun. 5, 2020, https://web.archive.org/web/20200605104323/https://developer.mozilla.org/en-US/docs/Web/API/Page_Visibility_API, [retrieved om Aug. 11, 2021], 8 pages.

International Search Report and Written Opinion dated Aug. 20, 2021 for International Application No. PCT/US2021/032964 filed May 18, 2021 for Digits Financial, Inc., 15 pages.

U.S. Appl. No. 16/716,099, filed Dec. 16, 2019 by Wayne Chang, et al. for System and Method for Tracking Changes Between a Current State and a Last State Seen By a User, pp. 1-40.

U.S. Appl. No. 16/898,172, filed Jun. 10, 2020 by Wayne Chang, et al. for System and Method for Displaying Changes to a Number of Entries in a Set of Data Between Page Views, pp. 1-42.

International Search Report and Written Opinion dated Apr. 12, 2021 for International Application No. PCT/US2020/065269 filed Dec. 16, 2022 for Digits Financial, Inc., 13 pages.

Ross, Margy. Design Tip #152 Slowly Changing Dimension Types 0, 4, 5, 6 and 7. Blog Post at Kimball Group on Feb. 5, 2013. Retrieved from [http://www.kimballgroup.com/2013/02/design-tip-152-slowly-changing-dimension-types-0-4-5-6-7] on [Jul. 29, 2022] 6 pages. (Year 2013).

STACKOVERFLOW. How to detect if a variable has changed. Question posted on Stack Overflow on Mar. 23, 2011. Retrieved from [https://stackoverflow.com/questions/5401527/how-to-detect-if-a-variable-has-changed] in [Mar. 10, 2022]. 4 pages. (Year: 2011).

* cited by examiner

| 605 | 610 | 615 |
|---|---|---|
| SALES REVENUE | 1,100,000 | 1,000,000 |
| SERVICE REVENUE | 550,000 | 500,000 |
| MISC. REVENUE | 100,000 | 100,000 |
| COGS | 650,000 | 600,000 |
| OFFICE EXPENSE | 50,000 | 50,000 |
| ADVERTISING | 100,000 | 100,000 |
| RENT | 300,000 | 300,000 |
| ... 655 | ... | ... |

SYSTEM AND METHOD FOR TRACKING CHANGES BETWEEN A CURRENT STATE AND A LAST STATE SEEN BY A USER

CROSS-REFERENCE TO RELATED APPLICATION

The present application is a continuation of U.S. patent application Ser. No. 17/325,521, which was filed on May 20, 2021, by Wayne Chang et al. for SYSTEM AND METHOD FOR TRACKING CHANGES BETWEEN A CURRENT STATE AND A LAST STATE SEEN BY A USER, which is a continuation of U.S. patent application Ser. No. 16/716,099, which was filed on Dec. 16, 2019, by Wayne Chang et al. for SYSTEM AND METHOD FOR TRACKING CHANGES BETWEEN A CURRENT STATE AND A LAST STATE SEEN BY A USER, now issued as U.S. Pat. No. 11,048,378 on Jun. 29, 2021, both of which are hereby incorporated by reference.

BACKGROUND

Technical Field

The present invention relates generally to the display of information and, more particularly, to alerting a user to changes that have occurred to displayed information.

BACKGROUND INFORMATION

In software systems, graphical user interface (GUI) dashboards are often utilized to display a plurality of data to a user in an easy to read manner. Such dashboards may be utilized in a variety of differing computer software environments including, e.g., monitoring/control systems, engineering systems, financial systems, etc. For example, in a monitoring/control system, a dashboard may display temperatures, pressures, flow rates etc. In an exemplary financial system, a dashboard may display various financial measures, such as, e.g., revenue, expenses, financial ratios, etc.

Typically, systems continuously update states displayed on a dashboard display in substantially real time to enable a user to see the current state of the displayed information. A noted disadvantage of such substantially real time updating of dashboard displays is that a user's focus may have left the dashboard while an update occurs. For example, a user may have a GUI window containing the dashboard open, but then minimize that window to perform some other action in a different window. When the dashboard window is reopened, no indication is made of what, if any, states changed. This presents a noted disadvantage in that a user is left to rely on his or her memory to determine if any state has changed while his or her focus was elsewhere. This may result in the user missing an important state change. For example, a user may miss that a particular state has begun moving in an undesirable or dangerous manner. While typical software systems may have alert levels for when certain states exceed predetermined thresholds, it is often advantageous for a user to know that those states are getting close to the threshold level.

SUMMARY

The noted disadvantages of the prior art are overcome by providing a system and method for tracking changes between a current state and a last state seen by a user. Illustrative embodiments of the present invention improve the operation of computer systems by enabling the improved display of changes of data in a dashboard or other graphical user interface (GUI). During operation, while the user's focus is on the dashboard's window, any substantially real time updates to the data displayed in the dashboard will become reflected in the stored last user seen state.

However, should the user shift focus by, e.g., closing or minimizing a window, moving a window in front of the window displaying the dashboard, shifting to another application on a mobile device, etc., the system will continue to update the current state as changes occur. However, when the system detects that the user has shifted focus back to the dashboard displaying the data, the system will display an alert that highlights the changes between the user's last seen state and the current state. Illustratively, the system may determine whether user focus has shifted by, e.g., monitoring mouse movements (or lack thereof), whether a web browser is active or not, etc. In an illustrative embodiment, this alert may take the form of a change in color of the displayed state and/or animating the state as it changes from the user's last seen state to be the current state. This provides a graphical indication to a user of which states have changed. The system may then update the last seen state to the current state.

Illustratively, the last seen state is stored in the JavaScript localStorage on a user's computer. In alternative embodiments, the last seen state status information may be stored in other locations. For example, an application may store the status information, the status information may be stored in cookies, etc. Depending on the location where the last seen status information is stored, the ability to provide alerts may cross over sessions, apps, web site to application, etc.

BRIEF DESCRIPTION OF THE DRAWINGS

The above and further advantages of the present invention may be better understood in relation to the accompanying figures, in which like reference numerals indicate identical or substantially identical elements, of which.

DETAILED DESCRIPTION OF AN ILLUSTRATIVE EMBODIMENT

Figure 1:
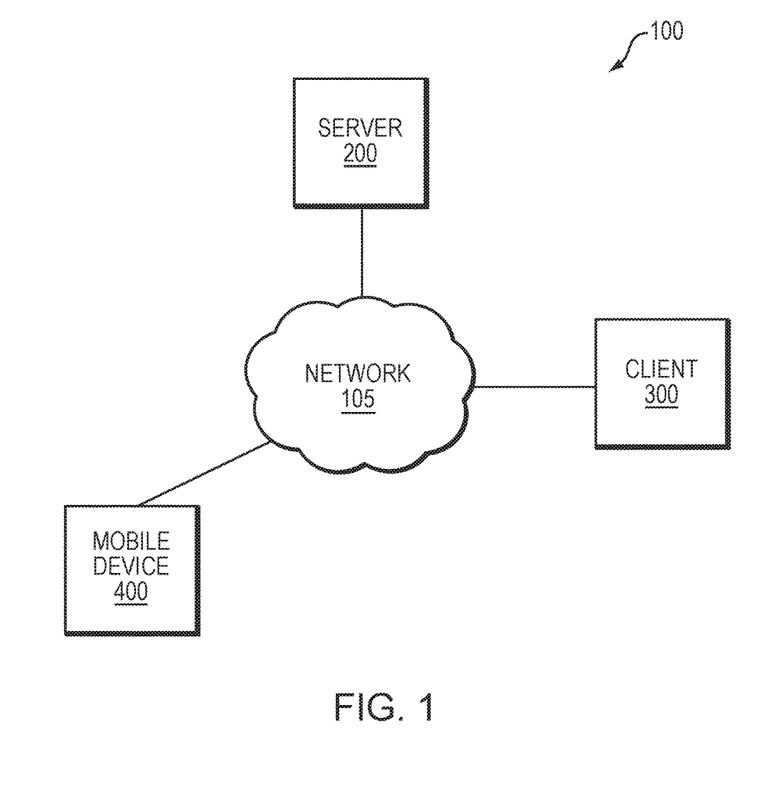
FIG. 1 is a schematic block diagram of an exemplary network environment in accordance with an illustrative embodiment of the present invention.

FIG. 1 is a schematic block diagram of an exemplary computer network environment 100 in accordance with an illustrative embodiment of the present invention. Specifically, the network environment 100 comprises of a network 105 that is operatively interconnected with one or more servers 200, clients 300, and/or mobile devices 400. It should be noted that network 105 is illustratively shown as a single network entity. However, it is expressly contemplated that network 105 may comprise of a plurality of interconnecting networks of the same and/or differing types, including, e.g., Wi-Fi networks, cellular telephone networks, local area networks (LANs), and/or wide area networks (WANs) including, for example, the well-known Internet. The various network connected entities typically communicate over the network 105 by exchanging discrete frames or packets of data according to predefined protocols, such as a Transmission Control Protocol/Internet Protocol (TCP/IP), Hypertext Transfer Protocol (HTTP), etc. Thus, for example, in an illustrative embodiment, a mobile device 400 may communicate using a cellular telephone network to transmit data. The exemplary cellular telephone network may then be interconnected with the Internet, which is further connected to a LAN, which ultimately is operatively connected to server 200.

Exemplary servers 200, described below in reference to FIG. 2, may execute an application that produces a dashboard when communicating with software executing on a client 300 or mobile device 400. Client computer 300, described further below in reference to FIG. 3, may comprise a user's computer that executes an application in accordance with an illustrative embodiment of the present invention. In alternative embodiments of the present invention, client computer 300 may communicate in a client-server relationship with server 200 to access an application executing on the server. In other alternative embodiments of the present invention, client computer 300 may execute a web browser that accesses server 200 to display information relating to an application.

Figure 4:
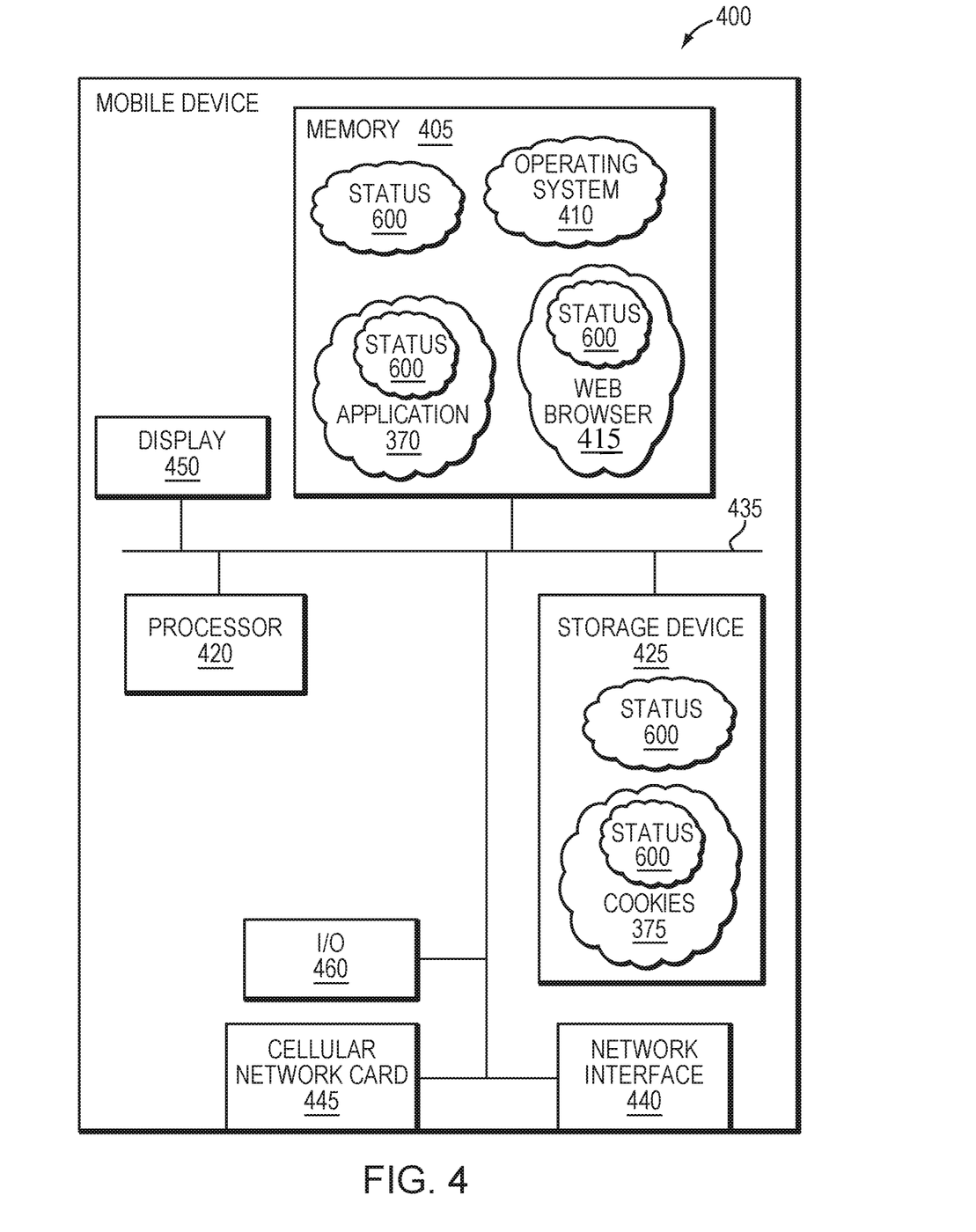
FIG. 4 is a schematic block diagram of an exemplary mobile device in accordance with an illustrative embodiment of the present invention.

Mobile device 400, described further below in reference to FIG. 4, is also illustratively operatively connected to network 105. Illustratively, mobile device 400 may comprise a smart phone, a personal digital assistant and/or a tablet computer. More generally, mobile device 400 may comprise any movable device capable of executing applications and/or accessing the worldwide web (WWW) via, e.g., a web browser.

Further, it should be noted that while a single server 200, client 300, and mobile device 400 are described and illustrated, in alternative embodiments of the present invention, a plurality of such network entities may be utilized. Therefore, the description and illustration of a single server 200, client 300, and/or mobile device 400 should be taken as exemplary only.

Figure 2:
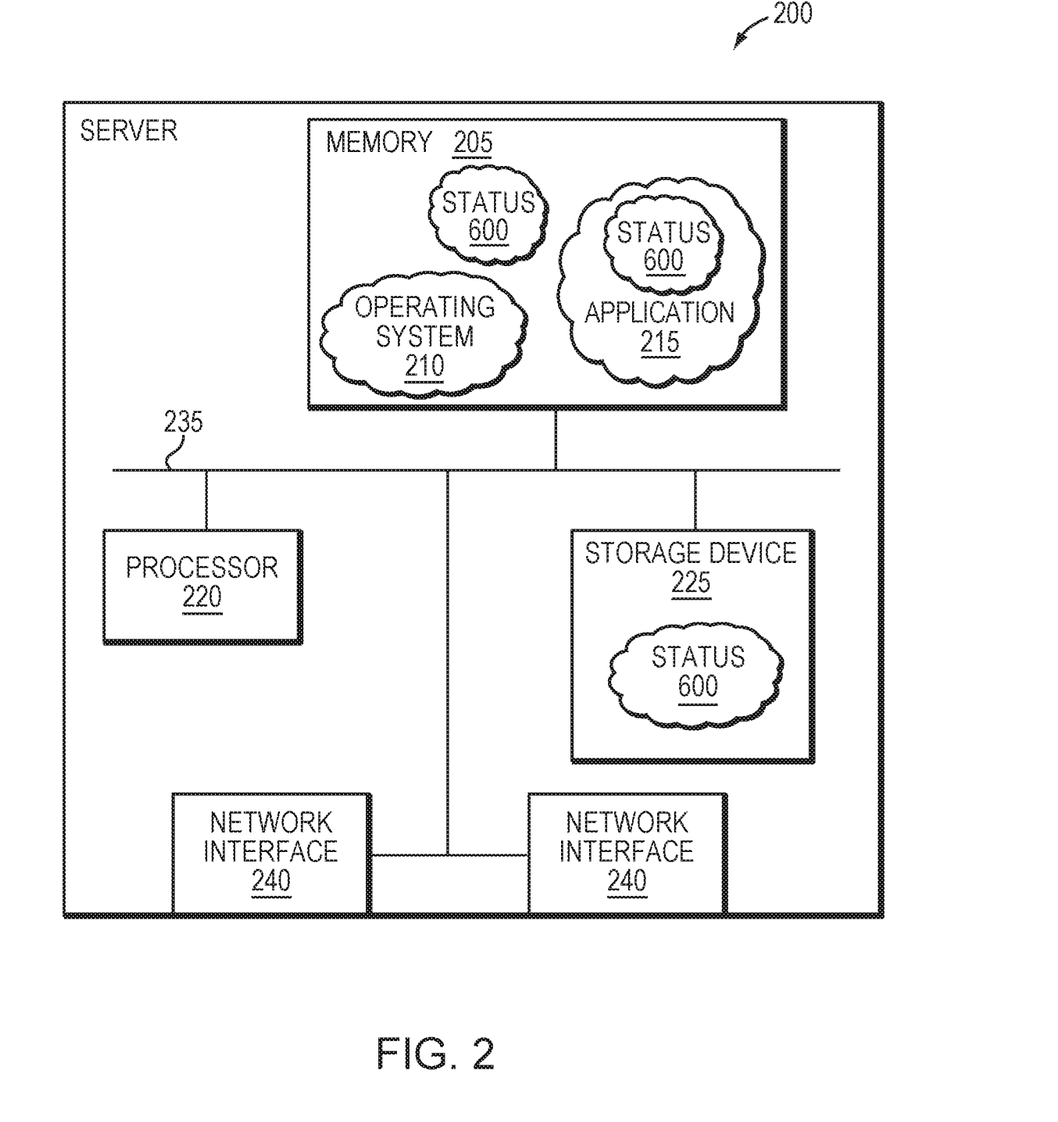
FIG. 2 is a schematic block diagram of an exemplary server system in accordance with an illustrative embodiment of the present invention.

FIG. 2 is a schematic block diagram of an exemplary server 200 in accordance with an illustrative embodiment of the present invention. The server 200 may illustratively comprise of one or more network interfaces 240, one or more processors 220, one or more storage devices 225, and a memory 205 operatively interconnected by a system bus 235.

The network interface 240 illustratively contains the mechanical, electrical, and signaling circuitry for communicating data over physical links coupled to a network. The network interface may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 240 may also be used to implement one or more virtual network interfaces, such as for Virtual Private Network (VPN) access, as is known to those skilled in the art.

The memory 205 comprises a plurality of locations that are addressable by the processor(s) 220 and the network interface 240 for storing software programs and data structures associated with the various embodiments described herein. The processor 220 may comprise necessary elements or logic adapted to execute software programs and manipulate data structures. An operating system 210, portions of which are typically resident in memory 205 and executed by the processor(s), functionally organizes the server 200 by, inter alia, invoking network operations in support of software processes and/or services executing on the server. An application 215, portions of which may be resident in memory 205, is executed by the processor to implement various functionality, such as an engineering monitoring system, a financial accounting system, etc. The descriptions and illustrations contained herein are directed towards an exemplary application 215 that implements a financial accounting system. However, it should be noted that it is expressly contemplated that the application 215 may implement other types of systems. Therefore, the description of a financial accounting system application 215 should be taken as exemplary only.

In accordance with an illustrative embodiment of the present invention, the application processes various data in accordance with user commands and, in part, displays a dashboard containing one or more states or values of one or more entries, such as financial accounts, ratios, etc. In an illustrative embodiment, such states are displayed in a graphical user interface (GUI) dashboard; however, it is expressly contemplated that in alternative embodiments of the present invention, such display of the states of one or more entries may be done in non-dashboard environments. The GUI dashboard illustratively may be displayed on a web page on a user computer 300 and/or mobile device 400. In alternative embodiments, GUI dashboard may be displayed by an application executing on computer 300 and/or mobile device 400. Therefore, the various descriptions of data being displayed in a dashboard window and the location of that window should be taken as exemplary only.

It should be noted that in an illustrative embodiment of the present invention, the application 215 may be configured to operate in a client/server manner in which the application 215 executes on the server, but displays data on a client 300 and/or mobile device 400. In alternative embodiments of the present invention, the application 215 may interact with a web server (not shown) executing on server 200 to provide data or information accessible via a web browser that may be executed on, e.g., client 300 or mobile device 400.

The storage device 225, which may be internal or external to the server 200, stores data associated with the operating system 210 and application 215. In alternative embodiments, storage device 225 may comprise a plurality of devices, which may be internal and/or external to server 200. Storage device 225 may comprise a cloud-based storage, RAID array, etc. in accordance with alternative embodiments of the present invention. In accordance with an illustrative embodiment of the present invention, the storage device 225 stores a status data structure 600, described further below in reference to FIG. 6.

Figure 6:
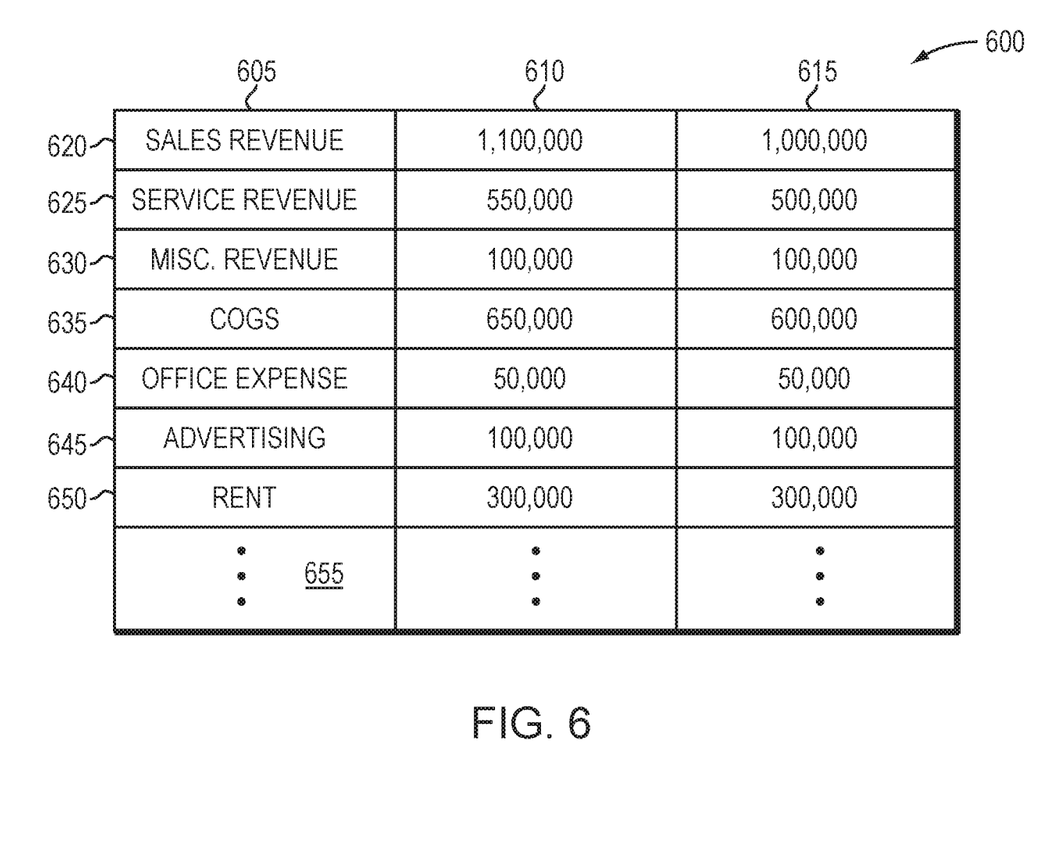
FIG. 6 is a diagram of an exemplary status data structure used to store a user's last seen state in accordance with an illustrative embodiment of the present invention.

The status data structure 600 illustratively stores the last seen states of one or more entries that are tracked in accordance with illustrative embodiments of the present invention. The status data structure 600 is illustratively shown as being stored on storage device 225. However, it should be noted that it is expressly contemplated that the status data structure 600 may be stored within memory 205 during execution of the application 215. In accordance with an illustrative embodiment of the present invention, storage of status information 600 on server 200 enables the application 215 to synchronize last seen state information across web browsers, devices, etc. For example, a user may view an exemplary dashboard on a mobile device, close the application on the mobile device, and then launch a web browser on a computer. Storage of status information 600 on the server 200 would enable application 215 to track the last seen state in such an environment.

Further, in alternative embodiments, the status data structure 600 may be stored within the application 215 and/or in memory 205. Depending on a particular embodiment and desired implementation, the status data structure 600 may be stored in a variety of locations on server 200. Further, in alternative embodiments, the status data structure 600 may not be stored on server 200, but may be stored on client 300 and/or mobile device 400. Therefore, the description of the status data structure 600 being stored on storage device 225 should be taken as exemplary only and not limiting. More generally, the status data structure 600 may be stored in any form of storage that may be accessed by the application to implement illustrative embodiments of the present invention.

In alternative embodiments of the present invention, the various functionalities may be distributed among a plurality of servers. As such, the description of a single server 200 should be taken as exemplary only. Also, while the embodiments herein are described in terms of processes or services implemented as software executing on a processor, alternative embodiments may include the processes described herein being embodied as modules consisting of hardware, software, firmware, and/or combinations thereof. Therefore, the description of software applications should be taken as exemplary only.

Figure 3:
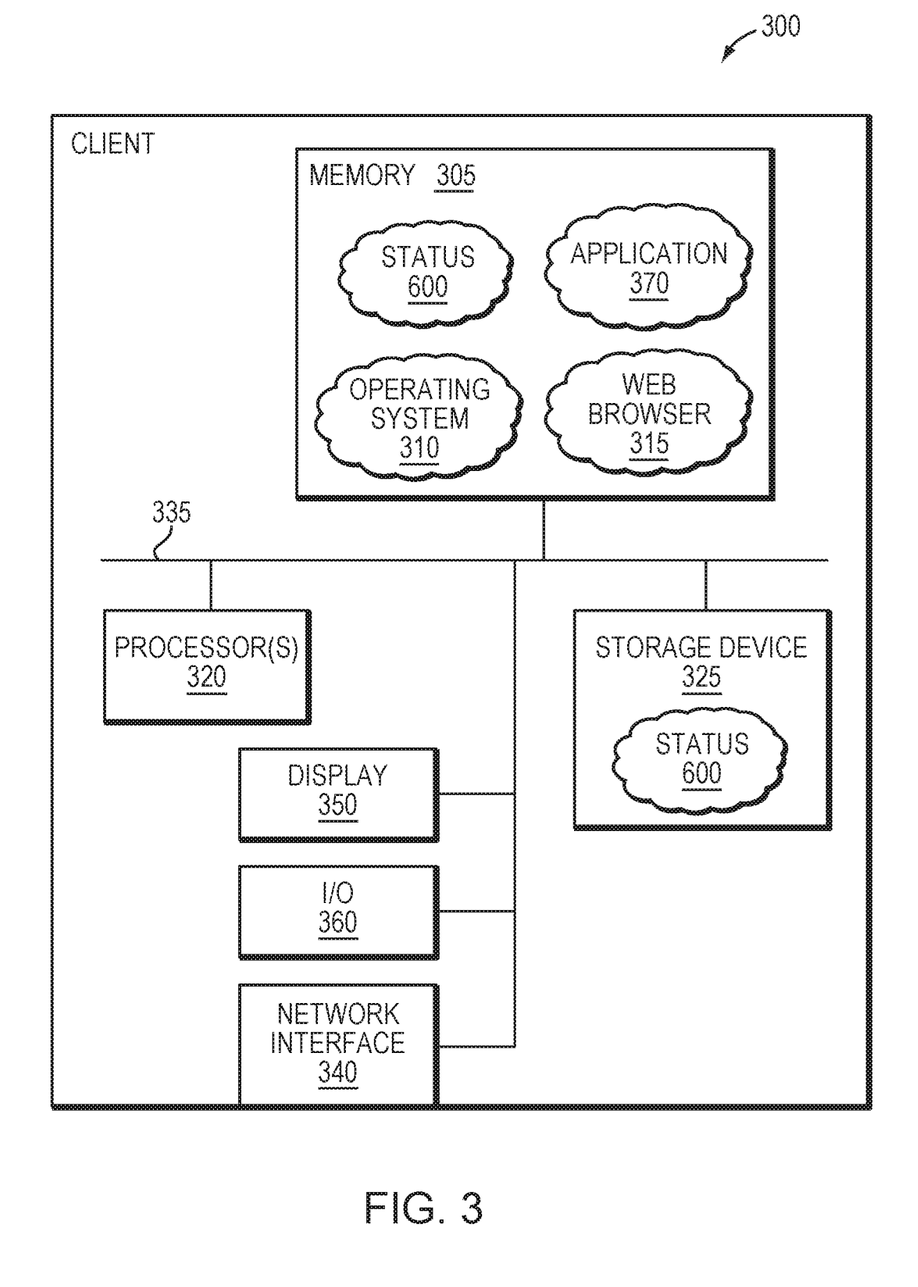
FIG. 3 is a schematic block diagram of an exemplary client computer system in accordance with an illustrative embodiment of the present invention.

FIG. 3 is a schematic block diagram of an exemplary client computer system 300 in accordance with an illustrative embodiment of the present invention. The client computer system 300, illustratively comprises a memory 305, one or more processors 320, one or more storage devices 325, a network interface 340, a display 350, and one or more forms of input/output (I/O) 360 that all operatively interconnected by a system bus 335. Memory 305, processors 320, storage device 325, operating system 310, and network interface 340 illustratively perform similar functions as described above in relation to server 200.

The display 350 may illustratively comprise a conventional liquid crystal display (LCD) computer monitor or other visual display as are known to those skilled in the art. The I/O system 360 may comprise, for example, a keyboard, mouse, light pen, touchscreen and/or other forms of inputting data and manipulating GUI elements in accordance with various embodiments of the present invention. In one illustrative embodiment, the I/O may comprise a keyboard and mouse that may be utilized to enter data and to rearrange a plurality of GUI windows.

A web browser 315 enables a user of the client computer system 302 to access a webpage provided by application 215. Illustratively, the web browser 315 accesses a webpage provided by application 215 via web server (not shown) executing on server 200. In accordance with an illustrative embodiment of the present invention, the web browser 315 implements the well-known JavaScript. In an illustrative embodiment, the status data structure 600 is stored within the localStorage implemented by JavaScript. In such embodiments, the localStorage may be stored on storage device 325. However, web browser 315 may retain a copy of the status data structure 600 in memory 305 for use in replaying actions, etc. In alternative embodiments, the status data structure 600 may be stored in cookies 375 within storage device 325, or in memory 305 of the computer 300. As will be appreciated by those skilled in the art, status data structure 600 may be stored in a plurality of locations at once. For example, an in-memory copy may exist for ready access by web browser 315 or application 370, but a persistent copy may be stored on storage device 325 to enable tracking across reboots, new sessions, etc. Any known synchronization techniques may be utilized to maintain consistency among various copies of status data structure 600.

In alternative embodiments, a local version of the application 370 may be stored in memory 305 and executed by processor 320. In such exemplary embodiments, status data structure 600 may be stored in memory 305 and/or on persistent storage 325. In accordance with alternative embodiments, the local application 370 may utilize the same persistent status data structure 600 stored on storage device 325 as is used by web browser 315. This enables, e.g., a user to use the application 370 and change to web based use using the browser 315 in a seamless manner.

FIG. 4 is a schematic block diagram of an exemplary mobile device 400 in accordance with an illustrative embodiment of the present invention. As noted above, mobile device 400 may comprise any device capable of executing applications and/or accessing the World Wide Web. Illustratively, mobile device 400 may comprise a smart phone, a personal digital assistant and/or a tablet computer. The mobile device 400 illustratively comprises network interfaces 440, one or more processors 420, a memory 405, a storage device 425, and a cellular network card 445 interconnected by a system bus 435.

Memory 405, processor 420, storage device, I/O 460, operating system 410, web browser 415, and network interface 440 function similar to those components described above. Display 450 may comprise a touchscreen that is used for both display and input purposes. Cellular network card 445 may implement the circuitry to enable the mobile device to access one or more cellular networks for, e.g., data transmission and reception.

Similar to that described above in reference to FIG. 3, status data structure 600 may be stored in a variety of locations on mobile device 400. As noted above, in an illustrative embodiment, the status information may be stored in JavaScript's localStorage on storage device 425. However, it is expressly contemplated that the status data structure 600 may be stored in other locations. Therefore, description of status data structure 600 being noted in storage device 425 should be taken as exemplary only.

Figure 5A:
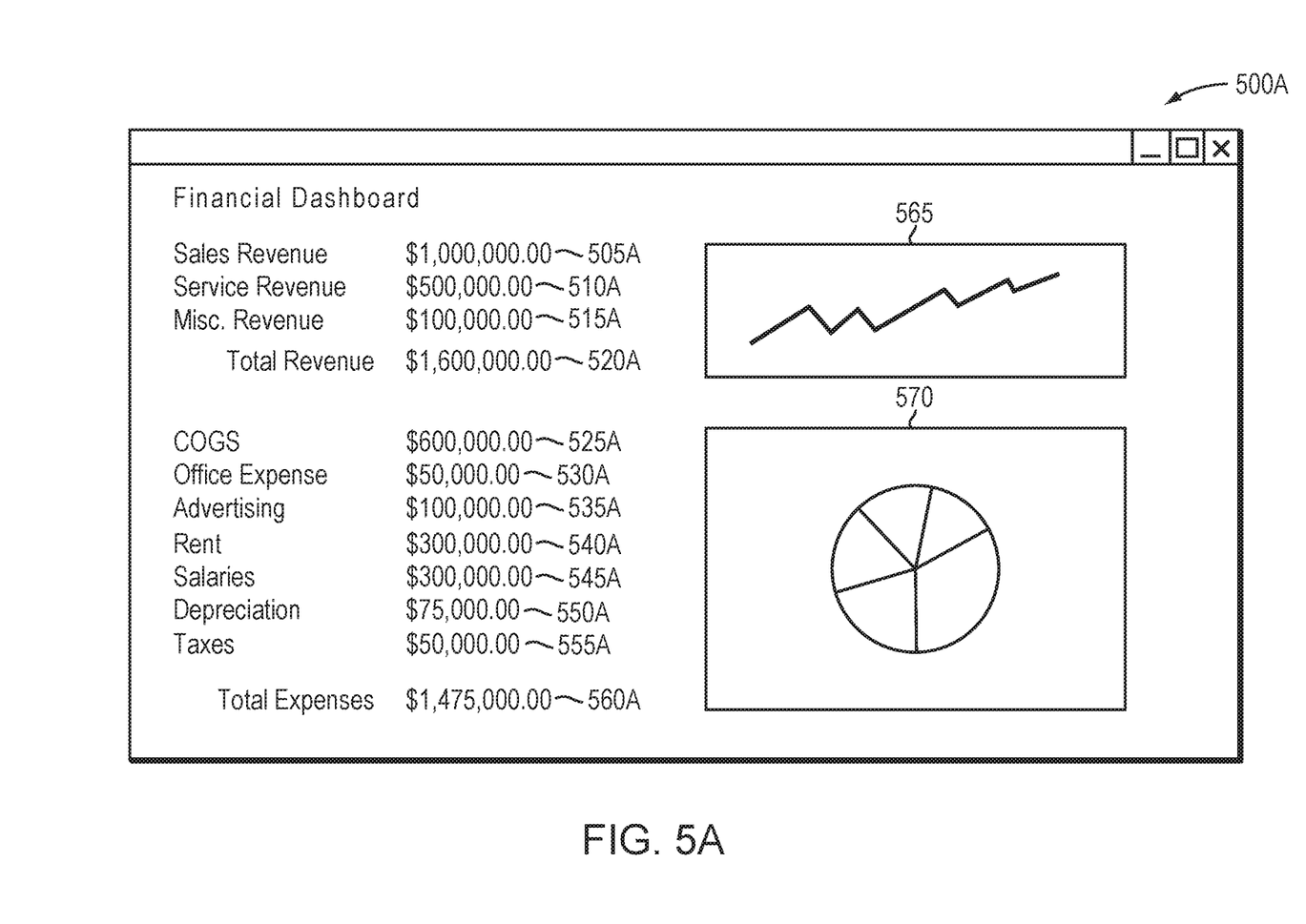
FIG. 5A is a view of an exemplary graphical user interface (GUI) window illustrating an exemplary financial dashboard in a first state in accordance with an illustrative embodiment of the present invention.

FIG. 5A is an exemplary graphical user interface (GUI) window 500A (GUI) illustrating a financial applications dashboard in a first state in accordance with an illustrative embodiment of the present invention. The window 500A illustratively displays one or more entries associated with various financial reporting accounts, including, e.g., sales revenue, 505A, service revenue 510A, miscellaneous revenue 515A, total revenue 520A, cost of goods sold (COGS) 525A, office expense, 530A, advertising expense 535A, rent 540A, salaries 545A, depreciation 550A, taxes 555A, and total expenses 560A. Further, exemplary charts 565 and/or graphs 570 may be displayed within dashboard window 500A.

It should be noted that the number, types, names, and arrangement of the various entries are shown for illustrative purposes only. As will be appreciated by those skilled in the art, a dashboard, or other GUI window, may have an almost limitless number of configurations. The particular layout and arrangement of the various components of the dashboard window 500A should be taken as exemplary only. In accordance with various illustrative embodiments of the present invention, the components of window 500A may be varied as is known by those skilled in the art.

Illustrative window 500A may be displayed while a user is actively monitoring the window, i.e., has the user's focus on the window. During such time, any updates to values will be shown in substantially real time within window 500A. Assume that at some point in time, the system detects that the user has shifted focus from window 500A. This may occur by, e.g., JavaScript executing within a web browser detecting that there has been no mouse movement or keystrokes for some time period, by detecting that the window 500A has been closed, etc. As will be appreciated by those skilled in the art, there are a plurality of techniques to determine whether a user has shifted focus from a window. Further, depending on a particular implementation, e.g., web browser, application executing on a computer, app executing on a mobile device, etc., differing techniques may be available depending on information that may be obtained from the computer system environment, operating system, etc. Any such technique maybe utilized in alternative embodiments of the present invention.

Figure 5B:
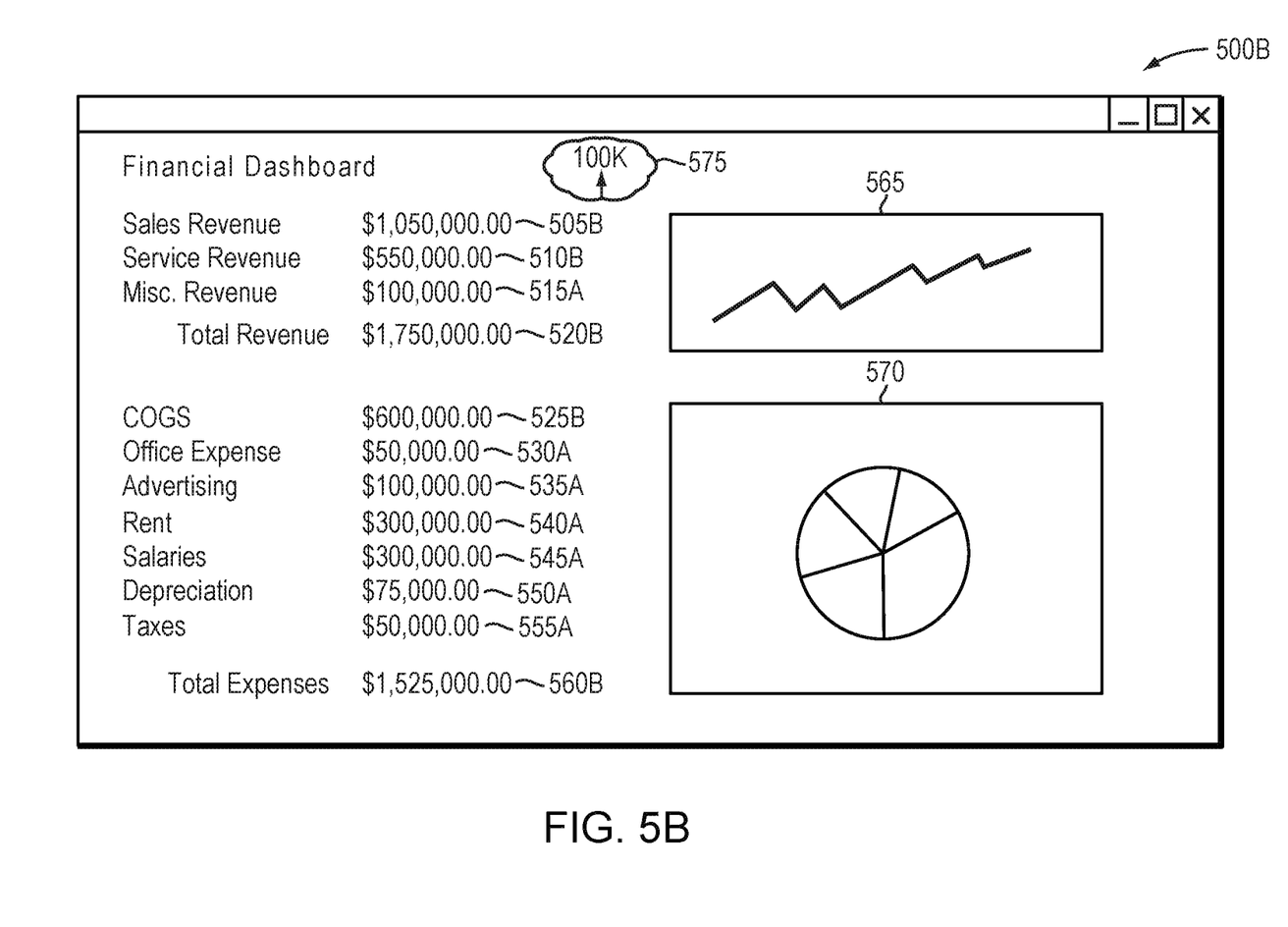
FIG. 5B is a view of an exemplary GUI window illustrating an exemplary financial dashboard in a second state in accordance with an illustrative embodiment of the present invention.

FIG. 5B is a diagram illustrating an exemplary GUI window 500B in a second state in accordance with an illustrative embodiment of the present invention. The second state as shown in window 500B is representative of the system illustrating an alert to the user when the user's focus has returned to the window after updates have occurred to one or more of the displayed values. Window 500A would be displayed and, at some point in time, the system detects that the user's focus has left window 500A. For example, while the user's focus is not on window 500A, the sales revenue value 505B, service revenue 510B, and the COGS value 525B increase. In prior art implementations, these values would be updated on screen in real time, which would result in the user missing notifications that the values changed. In accordance with an illustrative embodiment of the present invention, when it is detected that the user's focus has returned to window 500, the system will present an alert to the user to highlight the changes in values. In accordance with an illustrative embodiment of the present invention, the alert comprises of an animation of the value from the last seen value to the current value. Further, in an illustrative embodiment, an icon or other image may be displayed that shows the delta value (i.e., the direction and total change in value) while the animation is playing. If a plurality of values have changed, the animations may be played simultaneously or may be staggered.

In the example described herein, where sales revenue 505B, service revenue 510B, and COGS 525B have increased, window 500B illustrates a second state where the sales revenue value 505B is being animated and showing an intermediate state ($1,050,000). An exemplary icon 575 is shown that illustrates that the sales revenue value 505B has increased by $100,000.

Figure 5C:
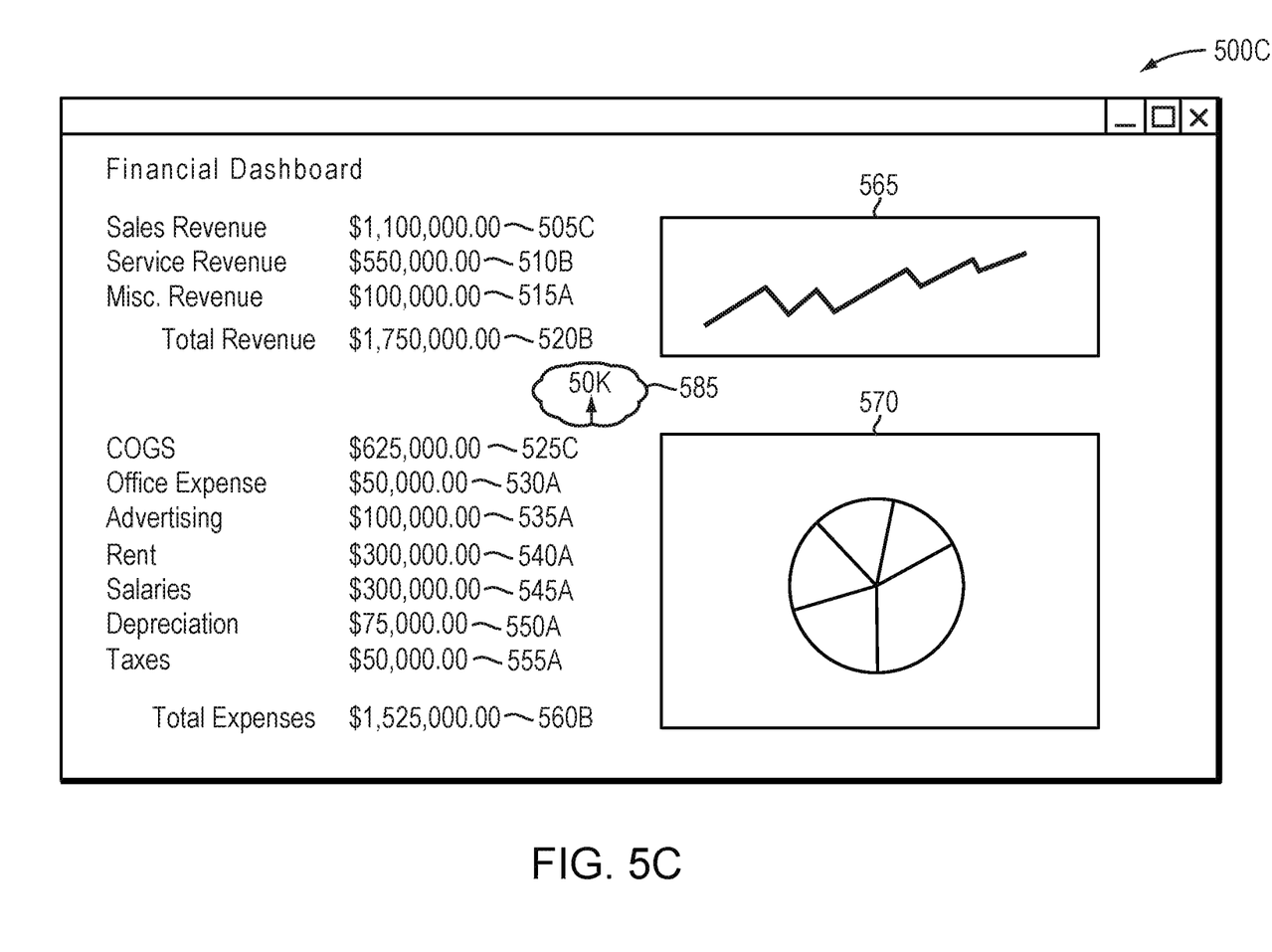
FIG. 5C is a view of an exemplary GUI window illustrating an exemplary financial dashboard in a third state in accordance with an illustrative embodiment of the present invention.
Figure 5D:
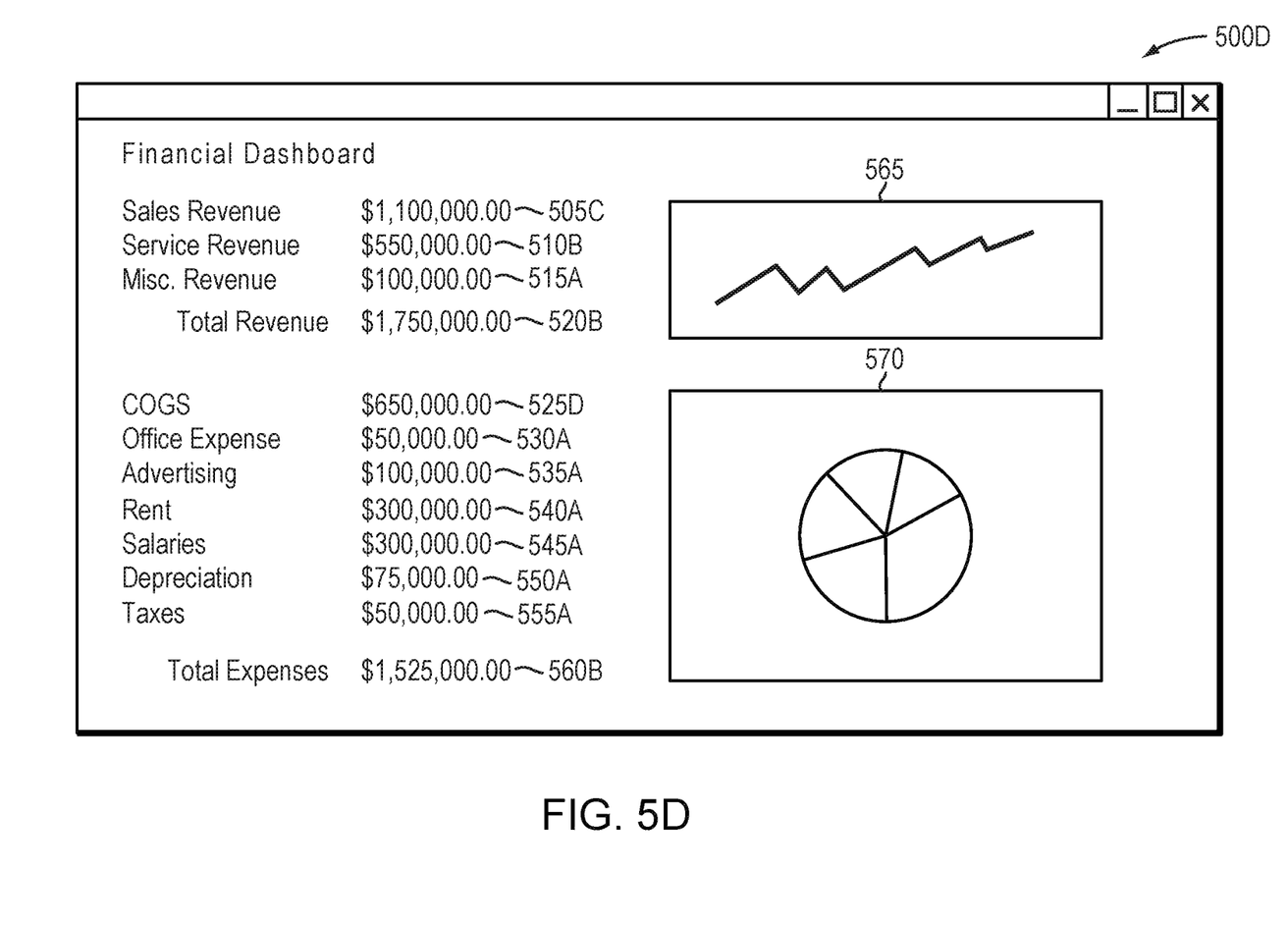
FIG. 5D is a view of an exemplary GUI window illustrating an exemplary financial dashboard in a fourth state in accordance with an illustrative embodiment of the present invention.

FIG. 5C is a diagram illustrating an exemplary GUI window 500C in a third state in accordance with an illustrative embodiment of the present invention. In window 500C, the animation has completed for the sales revenue 505, which now shows the updated value 505C (i.e., $1,100,000). The animation for the COGS 525C has begun and is shown at an intermediate state ($625,000). The Total Revenue 520B has been updated to reflect the increase. An icon 585 is shown that illustrates that the COGS has increased by $50,000. FIG. 5D is a diagram illustrating an exemplary GUI window 500D in a fourth state in accordance with an illustrative embodiment of the present invention. Window 500D illustrates the state of window 500 after all animations have been completed and the window 500 is illustrating the current state. Exemplary FIGS. 5A-5D illustrate the multistep animations of first the sales revenue value 505A,B,C,D and then the COGS value 525A,B,C,D as may be performed in accordance with an illustrative embodiment of the present invention. It should be noted that in alternative embodiments, animations may occur simultaneously to reduce the time required to get to the current state. Similarly, in alternative embodiments, one or more values may be animated simultaneously, and then a second group of one or more values may be animated, etc. Groups may be selected based on the relationships among values, which may be predetermined by the application or, in alternative embodiments, may be user configurable.

FIG. 6 is an exemplary data structure 600 for storing status information in accordance with an illustrative embodiment of the present invention. It should be noted that exemplary data structure 600 is shown for illustrative purposes only. In accordance with alternative embodiments of the present invention, the status information may be retained within application 215, or elsewhere. Further, in alternative embodiments of the present invention, the information described as being contained within the status data structure 600 may be stored in a variety of differing data structure formats. For example, in an illustrative embodiment where the status information is stored in localStorage of JavaScript running within a web browser, the information would be stored in the format defined by localStorage. Similarly, should the status information be stored in cookies accessible by a web browser, the information would be stored in that format. More generally, status data structure 600 is used to store the last state of particular values that have been seen by a user. In alternative embodiments, it also stores the current state. However, in other alternative embodiments of the present invention, the current state is acquired from the application 215 and is not stored with the last seen state. Therefore, the description of status data structure 600 should be taken as exemplary only.

Illustratively, status data structure 600 comprises of three columns, an entry column 605 that identifies which entry each row is associated therewith, a current status column 610, and a last seen status column 615. Each exemplary row of the data structure 600 is associated with a particular entry that is tracked in accordance with illustrative embodiments of the present invention. Utilizing the exemplary financial dashboard window 500A, as described above, status data structure 600 may have exemplary rows including sales revenue 620, service revenue 625, miscellaneous revenue 630, COGS 635, office expense, 640, advertising 645, rent 650, and in alternative embodiments, additional and/or differing rose 655. As is illustrated in exemplary data structure 600, row 620 representative of sales revenue, column 610 shows a value of $1,100,000 which is representative of the current state of that particular entry. In row 620, a value of $1,000,000 is stored in the last seen state, column 615. As the stored states in column 610 differ from column 615, the system has tracked that the current state is different from the last seen state.

In alternative embodiments of the present invention, the status data structure 600 may store additional information. For example, the status data structure 600 may store an intermediate value, i.e., a value that is between the last seen and the current value. Such intermediate values may be utilized to enable the system to highlight the change from a last seen value to the intermediate value before updating to the current value. An example of where an intermediate value may be desirable is if the intermediate value exceeds some threshold. In such an alternative embodiment, upon detection of the user's focus returning to the window, the system may highlight the change between the last seen value and the intermediate value to alert the user that a threshold was exceeded, albeit potentially on a temporary basis. Further, the storage of intermediate values may enable the system to replay changes between two arbitrary points in time. In alternative embodiments, such intermediate states may not be stored in status data structure 600, but may be recreated by application for display to use. Therefore, the description of storage of one or more intermediate states should be taken as exemplary only.

As described further below, when a user's focus shifts back to the exemplary dashboard 500, the system will highlight the change in states. In one exemplary embodiment, this may comprise animating the value from the last seen state, 615 to the current state 610 when the users focus shifts back to the window. However, as described further below, a variety of differing alerts may be utilized in accordance with alternative embodiments of the present invention.

In accordance with an illustrative embodiment of the present invention, the system may monitor mouse movements and/or keystroke to determine whether a user's focus has shifted. In alternative embodiments, detection of the closure of an application on a mobile device, closing/opening a GUI window, etc. may also be used to detect whether a user's focus has left and/or returned to the dashboard. As will be appreciated by those skilled in the art, there are a plurality of techniques that may be used to determine a user's focus. It is expressly contemplated that the principles of the present invention may be used with any such technique.

Figure 7:
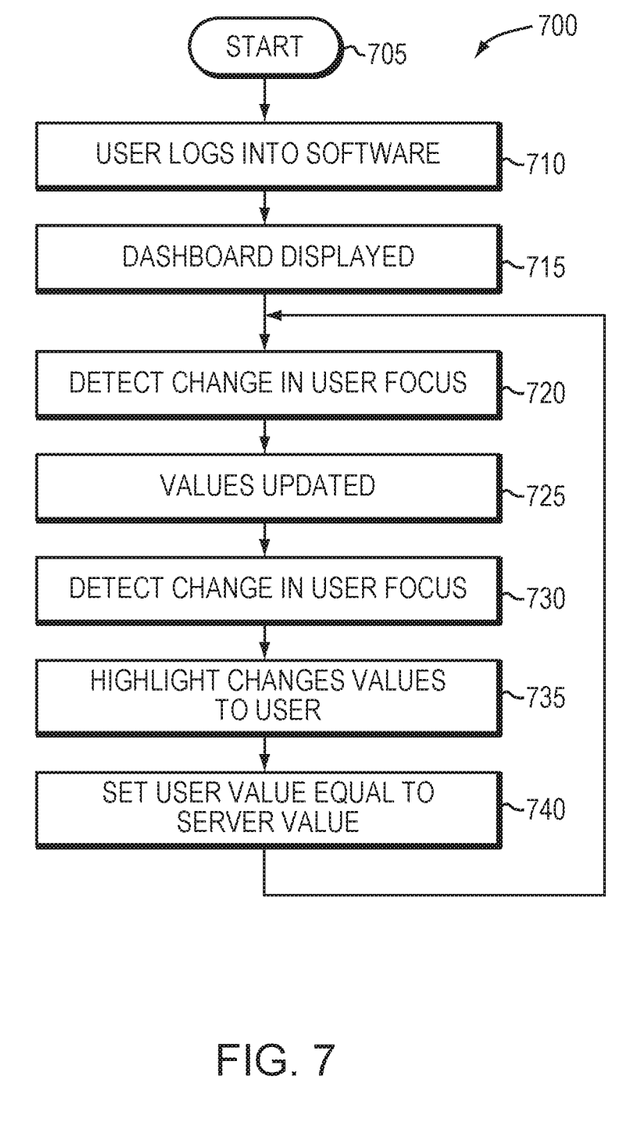
FIG. 7 is a flowchart detailing the steps of a procedure for alerting a user of changes to the state after focus has shifted from a dashboard in accordance with an illustrative embodiment of the present invention.

FIG. 7 is a flowchart detailing the steps of a procedure 700 for alerting a user in accordance with an illustrative embodiment of the present invention. The procedure 700 begins in step 705 continues to step 710 where user logs into or initiates an application. This may comprise executing an application locally on a user's computer or mobile device, or may comprise logging into an application executing on a server. During operation of the application, a dashboard is displayed to the user in step 715. Illustratively this dashboard may be displayed via a web browser or on a locally executing application. At some later point in time, the system detects a change in the user focus in step 720. A change in the user focus may be caused by for example, a user minimizing a window in which the dashboard is displayed, closing the application, moving a window on a display so that it covers the dashboard window, bringing a new application to the front when utilizing a mobile device, etc. As noted above, the system may monitor mouse movements and/or keystrokes to determine whether a user's focus has left the window. For example, if no mouse movements have occurred within a predefined time period, the system may make the determination that the user has changed focus from the window.

While the system is detecting that user focus is not on the dashboard, states are still updated in step 725. This may occur because of the normal operation of the application. That is, during operation of the application, transactions may be processed in a financial system, new data is received in a monitoring system, etc.

At some later point in time the system detects the change in user focus back to the application in step 730. As noted above, the system may use any of a variety of differing techniques to detect that a user's focus has returned to the application. Examples include, e.g., detection of mouse and/or keyboard activity, opening an application, maximizing a window, etc. It is expressly contemplated that any technique for detecting that focus has returned to the application or GUI window may be utilized in alternative embodiments of the present invention. Therefore, the examples given should be viewed as exemplary only and not limiting.

In response, the system highlights the changed states to the user in step 735. The user value is then set equal to the server value in step 740 before the procedure loops back to step 720. In an exemplary embodiment of the present invention, the highlighting of the change in state may comprise changing the color of and/or animating the state as it changes from the last seen state to the current state. As described above in relation to FIGS. 5A-5D, in an illustrative embodiment, values may be animated in a serial manner while an icon is displayed to show the delta (change and direction) between the last seen state and the current state. In alternative embodiments, all values may be animated at once. In further alternative embodiments, one or more groups of values may be animated simultaneously, with other groups being animated serially. Additionally, non-numeric display values, e.g., a graph, chart, etc., may be similarly animated to show changes since the last seen state. For example, a pie chart may flash, and the various slices of the pie chart may be highlighted while they grow or shrink from the last seen state to the current state. Another example would be a graph that flashes one or more graph lines as they extend from the last seen state to the current state to draw attention to the user that a change has occurred. More generally, the system may be configured to highlight the changes to the user when his or her focus has returned to the application.

It should be noted that in alternative embodiments of the present invention, the technique to highlight the changed state may vary. As such, the description of changing the color of and/or animating the state changing should be taken as exemplary only.

Figure 8:
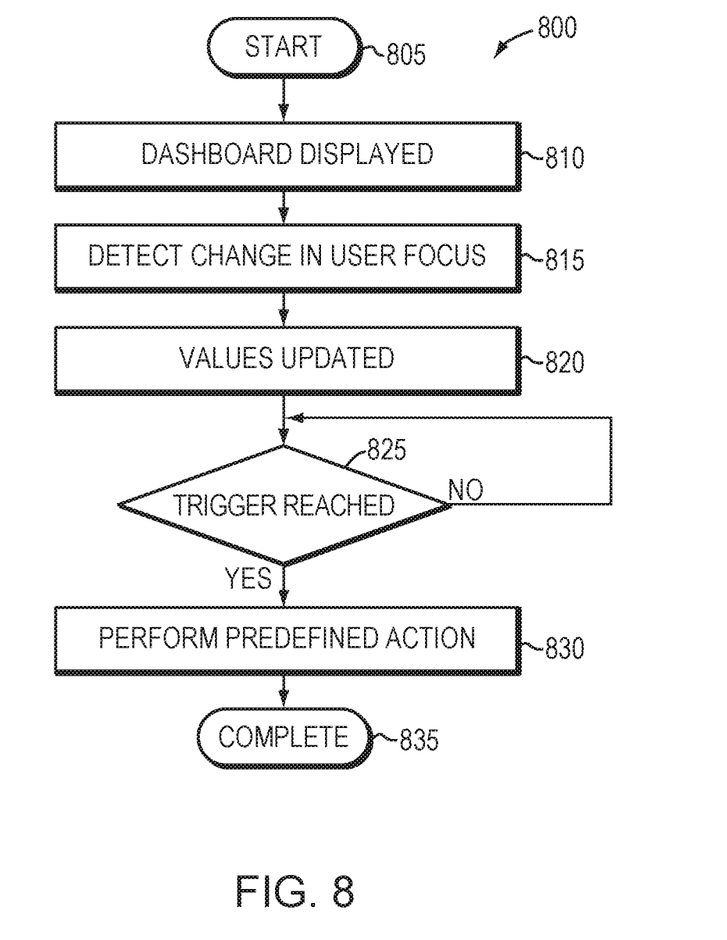
FIG. 8 is a flowchart detailing the steps of a procedure for providing alerts to a user in accordance with an illustrative embodiment of the present invention.

FIG. 8 is a flowchart detailing the steps of procedure 800 for alerting the user in accordance with an illustrative embodiment of the present invention. Procedure 800 begins at step 805 continues to step 810 where a dashboard is displayed. At some later point in time, the system detects a change in user focus in step 815. As noted above, any of a plurality of techniques may be utilized to determine that the user's focus has shifted from the dashboard.

After the user focus has left the dashboard, one or more values are updated in step 820. Again, as noted above, this may occur due to continued operation of the application, processing of transactions, new inputs from sensors, etc. depending on the type of dashboard and application that is being utilized.

A determination is made in step 825 whether one or more predefined triggers have been reached in relation to the updated values. Examples of a trigger being reached, may include the user bringing his focus back on the application, a configurable time period expiring without the user bringing his focus back on the application, one or more of the values of the entries differing from the last seen value by a configurable margin, etc. Should a trigger not be reached, the system continues with no action and continues monitoring until such a trigger point is reached.

Should a trigger be reached, the procedure continues to step 830 where a predefined action is performed. The system, such as application and/or software included in the displayed website, may implement any of a plurality of actions. In one embodiment, if the trigger is defined as a particular value exceeding a predefined or configurable threshold, the action may comprise sending an alert to the user. As the user's focus is not on the window, the alert may comprise, e.g., emailing the user, sending a SMS or other message to the user, causing an audible alarm, etc. Once the predefined action has occurred, the procedure 800, then completes in step 840.

In an illustrative embodiment of the present invention, procedures 700 and 800 may be executing concurrently. That is, should a user's focus return to the window, procedure 700 will be performed; however, if the focus is not returned prior to a triggering event, procedure 800 will be executed.

It should be noted that while the present disclosure is written in terms of dashboards, the principles of the present invention may be utilized with any graphical user interface in which the status of one or more entries is displayed. Therefore, the term dashboard should be taken as exemplary only and should be interpreted to encompass any such graphical user interface that displays status or value information. Further, while this description has been written in terms of a financial software system, the principles of the present invention may be utilized with any form of software system that displays information in a graphical user interface. As such, the description of a financial system should be taken as exemplary only. While various components have been described as being implanted in hardware or software, it should be noted that it is expressly contemplated any of the functionality described herein may be omitted in hardware, software, firmware, or a combination thereof.

What is claimed is:

1. A computer implemented method, comprising the steps of:
    creating a status data structure for tracking value changes displayed in a window of an application, wherein the status data structure includes a plurality of entries, wherein a particular entry of the plurality of entries has a single record for storing a last seen value;
    displaying, on a display screen, the window including at least one data value being tracked and associated with the particular entry of the status data structure;
    detecting that a user has shifted a focus from the window;
    in response to detecting the user has shifted the focus from the window:
        storing a particular last seen value of the at least one data value in the particular entry of the status data structure, wherein the particular last seen value indicates a particular value of the least one data value that was last seen by the user when the user's focus was on the window,
    detecting that the user has shifted the focus back to the window; and
    in response to detecting that the user has shifted the focus back to the window:
        determining a particular current value of the at least one data value;
        determining if a particular intermediate value of the at least one data value exceeds a threshold;
        in response to determining that (1) the particular current value is different from the particular last seen value and (2) the particular intermediate value exceeds the threshold,
            highlighting a first change between the particular last seen value and the intermediate value and highlighting a second change between the particular last seen value and the particular current value; and
        in response to determining that (1) the particular current value is different from the particular last seen value and (2) the particular intermediate value does not exceed the threshold,
            highlighting a third change between the particular last seen value and the particular current value.

2. The computer implemented method of claim 1 wherein detecting that the user has shifted the focus from the window comprises detecting that an input device has not been utilized for a predetermined amount of time.

3. The computer implemented method of claim 1 wherein detecting that the user has shifted the focus from the window comprises detecting that the user has minimized the window.

4. The computer implemented method of claim 1 wherein detecting that the user has shifted the focus back to the window comprises detecting that an application associated with the window has been initialized.

5. The computer implemented method of claim 1, wherein the particular intermediate value is between the particular last seen value the particular current value.

6. The computer implemented method of claim 1, wherein the highlighting the first change includes animating a first portion of the window to show a transition between the particular last seen value and the particular intermediate value, and
    the highlighting the second change includes animating a second portion of the window to show a transition between the particular last seen value and the particular current value.

7. The computer implemented method of claim 1 wherein the highlighting the third change includes animating a portion of the window to show a transition between the particular last seen value and the particular current value of the at least one data value.

8. The computer implemented method of claim 1 wherein the status data structure is stored in JavaScript localStorage.

9. The computer implemented method of claim 1 wherein the status data structure is stored in a storage device associated with a mobile device.

10. A device comprising:
    a processor;
    a web browser executing on the processor, the web browser displaying a window including a at least one data value; and software executing on the processor, the software configured to:
  maintain a status data structure for tracking value changes displayed in a window of an application, wherein the status data structure includes a plurality of entries, wherein a particular entry of the plurality of entries has a single record for storing a last seen value;
  detect that a user has shifted a focus from the window;
  in response to detecting the user has shifted the focus from the window:
    determine a particular current value of the at least one data value;
    determine if a particular intermediate value of the at least one data value exceeds a threshold;
    is in response to determining that (1) the particular current value is different from the particular last seen value and (2) the particular intermediate value exceeds the threshold,
      highlight a first change between the particular last seen value and the intermediate value and highlighting a second change between the particular last seen value and the particular current value; and
    in response to determining that (1) the particular current value is different from the particular last seen value and (2) the particular intermediate value does not exceed the threshold,
      highlight a third change between the particular last seen value and the particular current value.

11. The device of claim 10 wherein detecting that the user has shifted the focus from the window comprises detecting that an input device has not been utilized for a predetermined amount of time.

12. The device of claim 10 wherein detecting that the user has shifted the focus from the window comprises detecting that the user has minimized the window.

13. The device of claim 10 wherein detecting that the user has shifted the focus back to the window comprises detecting that an application associated with the window has been initialized.

14. The device of claim 10 wherein the particular intermediate value is between the particular last seen value the particular current value.

15. The device of claim 10 wherein
  the highlighting the first change includes animating a first portion of the window to show a transition between the particular last seen value and the particular intermediate value, and
  the highlighting the second change includes animating a second portion of the window to show a transition between the particular last seen value and the particular current value.

16. The device of claim 10 wherein the highlighting the third change includes animating a portion of the window to show a transition between the particular last seen value and the particular current value of the at least one data value.

17. The device of claim 10 wherein the status data structure is stored in JavaScript localStorage.

18. The device of claim 10 wherein the status data structure is stored in a storage device associated with a mobile device.

19. The device of claim 10 wherein the device is a mobile device.

20. One or more non-transitory computer-readable media, having stored thereon instructions that when executed by a computing device, cause the computing device to perform operations comprising:
  creating a status data structure for tracking value changes displayed in a window of an application, wherein the status data structure includes a plurality of entries, wherein a particular entry of the plurality of entries has a single record for storing a last seen value;
  displaying, on a display screen, the window including at least one data value being tracked and associated with the particular entry of the status data structure,
  determining that a user has shifted a focus away from the window based on one or more first events that indicate that the focus of the user is no longer on the window including the at least one data value being tracked;
  storing, in response to detecting the user has shifted the focus away from the window, a particular last seen value of the at least one data value in the particular entry of the status data structure, wherein the particular last seen value indicates a particular value of the at least one data value that was last seen by the user when the user's focus was on the window;
  determining that the user has shifted the focus back to the window based on one or more second events that indicate that the focus of the user is back on the window;
  highlighting, in response to detecting that the user has shifted the focus back to the window, a change between the particular last seen value stored in the data structure and a particular current value determined to be included in the window.

* * * * *

UNITED STATES PATENT AND TRADEMARK OFFICE
CERTIFICATE OF CORRECTION

| | |
|---|---|
| PATENT NO. | : 11,868,587 B2 |
| APPLICATION NO. | : 17/960424 |
| DATED | : January 9, 2024 |
| INVENTOR(S) | : Wayne Chang et al. |

It is certified that error appears in the above-identified patent and that said Letters Patent is hereby corrected as shown below:

In the Claims
Column 13, Line 16:
"is in response to determining that (1) the particular"
Should read:
"in response to determining that (1) the particular"

Signed and Sealed this
Fourth Day of June, 2024

Katherine Kelly Vidal
*Director of the United States Patent and Trademark Office*